(12) United States Patent
Konieczny et al.

(10) Patent No.: US 8,158,908 B2
(45) Date of Patent: Apr. 17, 2012

(54) DEVICE HAVING A LARGE ELECTRICALLY HEATABLE HONEYCOMB BODY AND MOTOR VEHICLE HAVING AT LEAST ONE SUCH DEVICE

(75) Inventors: Jörg-Roman Konieczny, Much (DE); Rolf Brück, Bergisch Gladbach (DE); Jan Hodgson, Troisdorf (DE)

(73) Assignee: EMITEC Gesellschaft fuer Emissiontechnologie mbH, Lohmar (DE)

( * ) Notice: Subject to any disclaimer, the term of this patent is extended or adjusted under 35 U.S.C. 154(b) by 149 days.

(21) Appl. No.: 12/625,734

(22) Filed: Nov. 25, 2009

(65) Prior Publication Data

US 2010/0133251 A1 Jun. 3, 2010

Related U.S. Application Data

(63) Continuation of application No. PCT/EP2008/055574, filed on May 6, 2008.

(30) Foreign Application Priority Data

May 25, 2007 (DE) .......................... 10 2007 024 563

(51) Int. Cl.
*B60L 1/02* (2006.01)
*H05B 3/78* (2006.01)

(52) U.S. Cl. ........ 219/202; 219/482; 219/549; 219/537; 392/488; 392/485; 60/300; 60/303; 422/174; 422/177; 29/611

(58) Field of Classification Search .................. 219/549, 219/537, 202, 482; 392/488, 485; 60/300, 60/303; 422/174, 177; 29/611
See application file for complete search history.

(56) References Cited

U.S. PATENT DOCUMENTS

| 4,505,107 A | 3/1985 | Yamaguchi et al. |
| 4,928,485 A * | 5/1990 | Whittenberger ................ 60/299 |
| 5,259,190 A | 11/1993 | Bagley et al. |
| 5,308,591 A | 5/1994 | Whittenberger |
| 5,370,943 A | 12/1994 | Brück et al. |
| 5,382,774 A | 1/1995 | Brück et al. |
| 5,411,711 A | 5/1995 | Swars |
| 5,525,309 A | 6/1996 | Breuer et al. |
| 6,184,506 B1 | 2/2001 | Shoji |

FOREIGN PATENT DOCUMENTS

| EP | 0937501 A1 | 8/1999 |
| JP | 5312029 A | 11/1993 |
| WO | 9202714 A1 | 2/1992 |
| WO | 9213636 * | 8/1992 |
| WO | 9213636 A1 | 8/1992 |

OTHER PUBLICATIONS

International Search Report dated Aug. 20, 2008.

* cited by examiner

*Primary Examiner* — Shawntina Fuqua
(74) *Attorney, Agent, or Firm* — Laurence A. Greenberg; Werner H. Stemer; Ralph E. Locher

(57) ABSTRACT

A device includes an electrically heatable honeycomb body, particularly for treating an exhaust gas flow of a mobile internal combustion machine. The device includes sheet metal foils forming channels and being in electrical contact with a housing. The housing has a terminal for connection to a voltage source, a plurality of contact points disposed remotely from the terminal for contacting the sheet metal foils and a respective contact conductor between the terminal and each contact point. The contact conductors have the same electrical resistance. A motor vehicle having at least one such device is also provided.

11 Claims, 3 Drawing Sheets

US 8,158,908 B2

DEVICE HAVING A LARGE ELECTRICALLY HEATABLE HONEYCOMB BODY AND MOTOR VEHICLE HAVING AT LEAST ONE SUCH DEVICE

CROSS-REFERENCE TO RELATED APPLICATION

This is a continuation, under 35 U.S.C. §120, of copending International Application No. PCT/EP2008/055574, filed May 6, 2008, which designated the United States; this application also claims the priority, under 35 U.S.C. §119, of German Patent Application DE 10 2007 024 563.9, filed May 25, 2007; the prior applications are herewith incorporated by reference in their entirety.

BACKGROUND OF THE INVENTION

Field of the Invention

The present invention relates to a device having a large electrically heatable honeycomb body, in which the honeycomb body has sheet-metal foils that form channels and are electrically contacted by a housing. The invention can be used in particular in the automotive field where, for example, electrically heatable honeycomb bodies with a diameter of greater than 200 mm are required. The invention also relates to a motor vehicle having at least one such device.

The development of electrically heatable metallic honeycomb bodies has been driven forward significantly by the corporate assignee of the instant application in the last 20 years. Reference may be made, for example, to International Publication No. WO 92/02714, corresponding to U.S. Pat. No. 5,411,711. That document describes a honeycomb body constructed from at least partially structured metal sheets which are disposed in layers and which form a plurality of channels that can be traversed by an exhaust gas and run from one end side to the other. Furthermore, a plurality of areal gaps and/or electrically insulating layers which run in a direction from one end side to the other are positioned in such a way that at least one continuous electrically conductive current path which runs in a cross-sectional plane is provided. The metal sheets are electrically conductively connected at their one end to a first terminal contact and at their other end to a second terminal contact. In that way, it is made possible, in particular, to realize a supply and discharge of current substantially in one plane.

A slightly different concept may also be gathered from International Publication No. WO 92/13636, corresponding to U.S. Pat. Nos. 5,525,309; 5,382,774 and 5,370,943. The electrically heatable honeycomb body described therein has at least two disks which are spaced apart from one another and which are positioned relative to one another through the use of support pins. That configuration makes it possible for a first disk to be constructed in such a way that it can be heated quickly by through-flowing exhaust gas or by electrical current, and/or for the mechanical strength of the honeycomb body to be ensured. In particular, that document also explains that it is possible for the metal sheets in the disks which are disposed in series to be connected to one another in an electrically conductive fashion through the use of support pins. It is proposed, in particular, that a meandering current path be formed which connects individual metal sheet packs of the two disks in series in a continuous fashion.

Even though the concepts explained above have substantially been very well proven and may presently be used in a wide variety of applications, there is nevertheless a demand for honeycomb bodies which are of even more simple construction and which are in particular suitable for generating uniform heating power even in the case of large cross sections or diameters (for example in static applications or in applications in the utility or commercial vehicle field).

SUMMARY OF THE INVENTION

It is accordingly an object of the invention to provide a device having a large electrically heatable honeycomb body and a motor vehicle having at least one such device, which overcome the hereinafore-mentioned disadvantages and highlighted problems of the heretofore-known devices and vehicles of this general type, which ensure uniform heating of a fluid flowing through the honeycomb body even in the case of a large diameter of the honeycomb body and which furthermore make the production of such honeycomb bodies simpler and less expensive.

With the foregoing and other objects in view there is provided, in accordance with the invention, a device, comprising an electrically heatable honeycomb body having sheet-metal foils forming channels and a housing electrically contacting the sheet-metal foils. The housing has a terminal for connection to a voltage source, a plurality of contact points, remote from the terminal, for contacting the sheet-metal foils, and contact conductors each connected between the terminal and a respective one of the contact points, the contact conductors having the same electrical resistance.

The channels of the honeycomb body preferably extend substantially rectilinearly and in the axial direction of the honeycomb body. The channels are formed with at least partially structured sheet-metal foils, with smooth and structured sheet-metal foils preferably being disposed in an alternating fashion to form one stack in each case. The sheet-metal foils may have wall sections (guide surfaces and the like), which project into the channels, and also slots or openings which may be provided for generating cross-mixing of the exhaust gas flowing through the channels and/or for setting a predefined current path.

The housing is generally a metallic, substantially tubular housing. The housing is now formed with (only) one terminal for connecting to a voltage source. Such a terminal, or a so-called electrode, serves in particular to conduct the current from the outside at least partially through the housing in an electrically insulated fashion, and thereby to enable a current supply to the sheet-metal foils. As a voltage source, consideration is given in particular to a battery, wherein a voltage of 12 to 14 Volts (or a multiple thereof such as 24, 36 or 42 Volts) should be provided as an operating voltage.

The housing also has a multiplicity of contact points for contacting the sheet-metal foils. This means in particular that a current flow from the terminal through the housing to the sheet-metal foils takes place not only through one individual contact point (or the electrode directly) but rather through a plurality of contact points which are connected in parallel. In this case, each contact point is generally formed as a separate constituent part of the housing, with the contact points in particular being insulated from one another. The connection of the contact point to the terminal takes place in each case through the use of a contact conductor which is likewise produced from an electrically conductive material. The contact conductors are now formed so as to have the same electrical resistance between the terminal and the respective contact point. This means in particular that the contact conductors bridge a different distance between the terminal and contact point, that is to say must "actually" have a different length.

It is nevertheless ensured in this case that the contact conductors have the same electrical resistance, which may be realized for example through the use of corresponding materials, contact conductors, cross sections and the like. In particular, the difference in the electrical resistances of all the contact conductors lies in a range of less than 10%, preferably less than 3%, and in particular less than 1%.

Under some circumstances, it is also possible for at least one contact conductor to be formed to be at least partially longer than the distance between the terminal and the contact point would require, wherein in particular a contact conductor reservoir is formed (for example through the use of the formation of a loop of the contact conductor). With the measure described herein, it is now ensured that, if a plurality of contact points are connected in parallel to the sheet-metal foils, a uniform supply of current, and therefore also uniform heating, is made possible in a highly effective manner.

In accordance with another feature of the invention, it is preferable if the sheet-metal foils are disposed in a multiplicity of stacks, with all of the sheet-metal foils of a stack being connected in an electrically conductive fashion to one contact point. In other words, this means for example that the cross section of the electrically heatable honeycomb body is formed with a multiplicity of stacks, in particular with at least three or even four stacks of sheet-metal foils wound independently of one another, which stacks are in particular electrically insulated from one another. In each case one individual contact point is now provided for each of the stacks, in such a way that all of the sheet-metal foils of the one stack are contacted in an electrically conductive fashion at the contact point.

In accordance with a further feature of the invention, the sheet-metal foils have opposite end regions through which the sheet-metal foils bear against the housing. This applies in particular if the honeycomb body is formed by a multiplicity of stacks. The sheet-metal foils are then preferably disposed in such a way that a single fold or maximum bend of the sheet-metal foils is generated, in such a way that all of the end regions of the sheet-metal foils are disposed at one side of the stack, and the curved, central section of the sheet-metal foils is disposed on the opposite side. The sheet-metal foils are now advantageously positioned in the housing in such a way that the end regions bear against the housing. In this case, it is preferable for all of the end regions of one stack to bear against the housing in such a way that no end regions of sheet-metal foils of other stacks are positioned in between.

In accordance with an added feature of the invention, the sheet-metal foils have an inner region which is connected in an electrically conductive fashion to an electrical ground. The inner region is in particular a region of the sheet-metal foils which is positioned substantially centrally between the end regions. If a multiple-stack configuration is again being used herein, the inner region is formed by that stack region which is situated opposite the end regions and which is formed with a tight bend. The contacting of the sheet-metal foils to an electrical ground takes place precisely in the inner region, that is to say, with regard to the stack, in a region situated remote from the end regions (in particular in a central region of the honeycomb body). A current path is therefore formed which proceeds from the terminal, then flows through a contact conductor to the respective contact pin, is subsequently introduced for example into a single stack and all of its sheet-metal foils, and then finally flows along the sheet-metal foils to the electrical ground. There, the current is discharged out of the sheet-metal foils.

In accordance with an additional feature of the invention, it is also considered to be advantageous for the sheet-metal foils to have the same electrical resistance from their contact point to an inner region which is connected in an electrically conductive fashion to an electrical ground. It is thereby now ensured not only that a uniform loading of the plurality of stacks with current takes place through the housing, but rather also that all of the sheet-metal foils of a stack are acted on in parallel and uniformly with current. It is thereby possible to realize a particularly homogeneous temperature field, and uniform heating power.

In accordance with yet another feature of the invention, the contact conductors of the housing are formed as a coating. An expedient method for the application of a coating which is suitable for this purpose, and which should in particular be electrically conductive and resistant to high temperatures and corrosion is, for example, flame spraying. The coating may then be applied to a fully closed housing, that is to say a housing which is not split in the circumferential direction, in a simple manner, with it being possible if required for electrical insulation layers to be applied or disposed between the contact conductors.

In accordance with yet a further feature of the invention, specifically to improve the stability of such an electrically heatable honeycomb body having a large cross section, it is also proposed that the one electrically heatable honeycomb body be supported through an end side on a further support body. This means, in particular, that measures are provided which act on (only) one end side of the electrically heatable honeycomb body (and if appropriate project into the channels) and which interact with a support body which is advantageously positioned downstream in the flow direction of an exhaust gas. A deformation of the electrically heatable honeycomb body, for example as a result of high thermal and dynamic loading such as occurs in the exhaust system of a motor vehicle, is thereby reduced.

In accordance with yet an added feature of the invention, in this connection, it is considered to be advantageous for a multiplicity of electrically conductive contact pins to support the electrically heatable honeycomb body through an end side and to connect the electrically heatable honeycomb body in an electrically conductive fashion to the further support body. This also means in other words that a supply of current takes place through the electrically heatable honeycomb body, and a discharge of current takes place through the support body, which is finally connected to an electrical ground. The second support body may therefore also be formed as an electrically heatable honeycomb body. In order to ensure permanent and stable electrical contact, it is proposed that the electrically conductive contact pins extend at least partially into the channels and/or winding openings in the inner region of the stack of sheet-metal foils, and thereby perform both functions.

In accordance with yet an additional feature of the invention, it is also advantageous if a plurality of separate contact conductors can be connected through the terminal and externally through a control unit to a voltage source. This means in particular that a separate supply of current to the individual stacks is made possible through the corresponding contact conductor, wherein the control unit controls the supply over time, or local supply, of current to at least one stack as required. The contact conductors may for example be provided (on the housing) and/or in the direction of the control unit (in particular externally) with a device for targeted prevention of a flow of current (for example switches etc.). It is thereby possible for the heating device to be operated in a demand-dependent and energy-efficient manner. In this case, it is fundamentally preferred with such operation to realize a discharge of current in the central region of the device, as described herein.

With the objects of the invention in view, there is concomitantly provided a motor vehicle, comprising at least one device according to the invention. It is particularly preferable for a device described herein according to the invention to be used with a motor vehicle. A motor vehicle of this type, in particular a utility or commercial vehicle (heavy goods vehicle, bus, etc.) has a mobile internal combustion engine or similar drive, with the exhaust gas generated therein finally being cleaned of pollutants and/or subjected to temperature treatment. The device proposed herein according to the invention can be traversed by the exhaust gas for these purposes. In this case, in addition to a catalytically active layer (at least partially in the channels), the device may also be provided with a further device for treating the exhaust-gas flow (storage layer, sealing compounds etc.).

Other features which are considered as characteristic for the invention are set forth in the appended claims, noting that the features specified in the dependent claims may be combined with one another in any desired technologically meaningful way and form further developments of the invention.

Although the invention is illustrated and described herein as embodied in a device having a large electrically heatable honeycomb body and a motor vehicle having at least one such device, it is nevertheless not intended to be limited to the details shown, since various modifications and structural changes may be made therein without departing from the spirit of the invention and within the scope and range of equivalents of the claims. The description, in particular in conjunction with the figures, specifies further particularly preferred exemplary embodiments of the invention.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
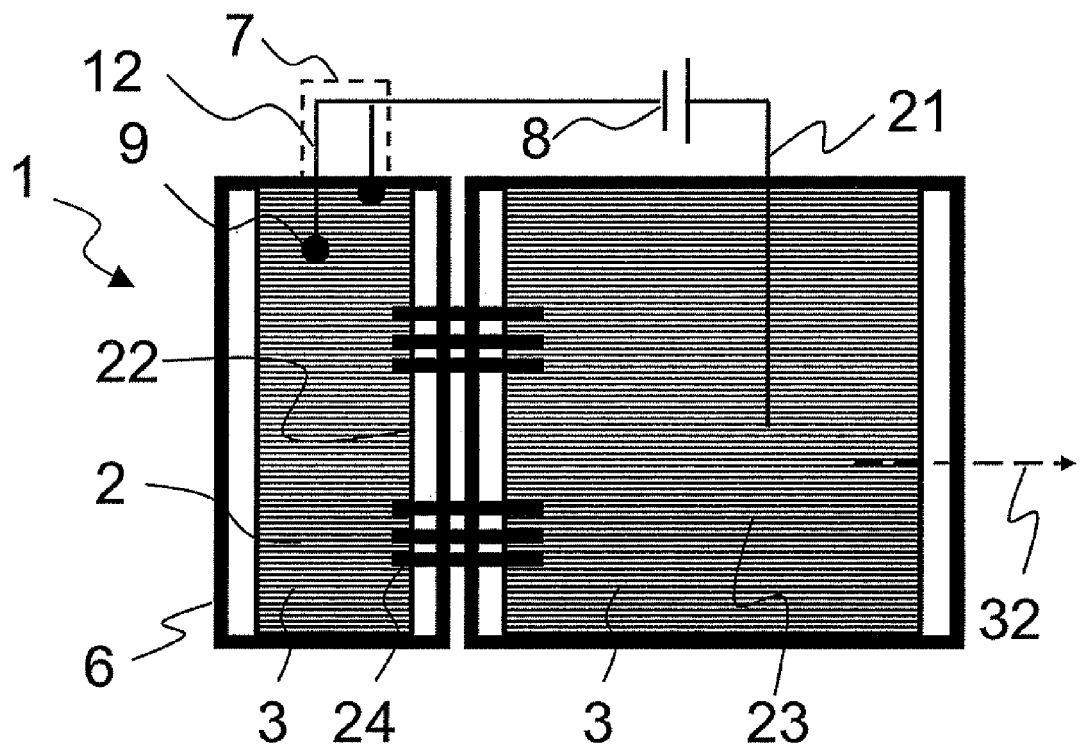
FIG. 1 is a diagrammatic, longitudinal-sectional view of a first embodiment of a device according to the invention.

Referring now in detail to the figures of the drawings, noting that the embodiments shown therein do not restrict the invention, and first, particularly, to FIG. 1 thereof, there is seen a diagrammatic, longitudinal section through a device 1 having an electrically heatable honeycomb body 2 and having a support body 23 positioned downstream in a flow direction 32 of the exhaust gas. The electrically heatable honeycomb body 2, which is shown at the left and which has a narrow or thin (10 to 15 mm) construction, is surrounded by a housing 6 and has a plurality of channels 3 extending between end sides 22. A single electrical terminal 7, which is provided for the electrically heatable honeycomb body 2, is connected to a voltage source 8. The terminal 7 is constructed in such a way that a first contact conductor 12 leading to a first contact point 9 enables an electrical connection to the honeycomb body 2. A further contact conductor and further contact points are also diagrammatically indicated, with the contact conductors being constructed so as to have the same electrical resistance.

After the current is introduced into the electrically heatable honeycomb body 2 through the terminal 7, the current flows through the electrically heatable honeycomb body 2 over a large area thereof and subsequently flows into contact pins 24 which are indicated in the figure and a corresponding multiplicity of which are disposed centrally and closely adjacent one another. The current is thereby transferred to the downstream support body 23, which is finally connected to electrical ground 21.

The embodiment shown herein illustrates that which is fundamentally also possible with other embodiments, specifically that the electrically heatable honeycomb body 2 is formed with a one-part housing 6, that is to say in particular that the provision of slots and/or of a multi-part construction with shells can be avoided, since the discharge of current takes place through the downstream support body 23.

Figure 2:
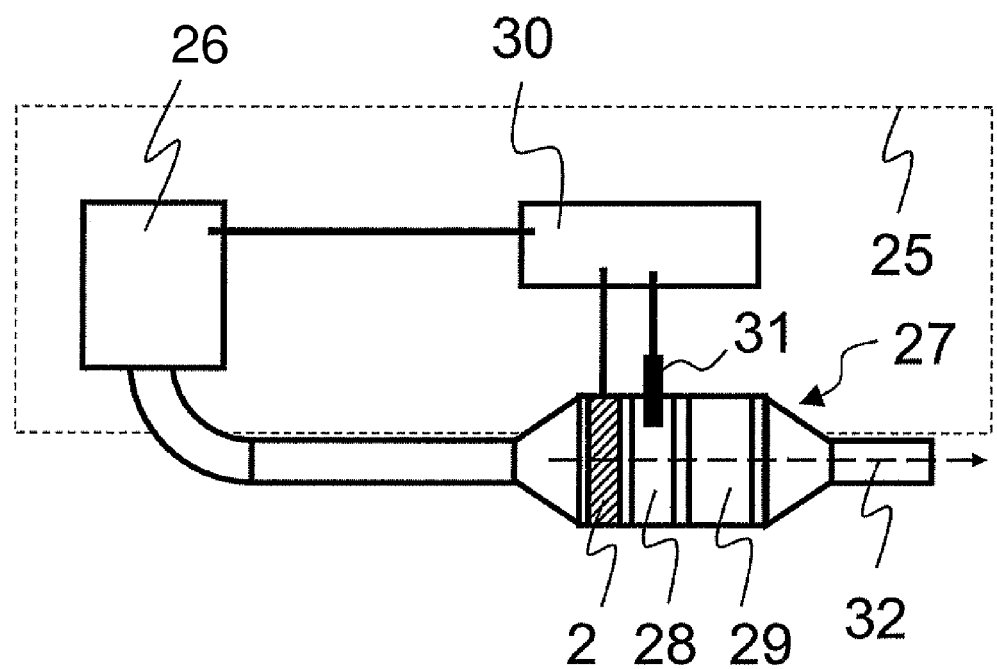
FIG. 2 is a schematic and block diagram of a possible embodiment of an exhaust system of a motor vehicle.

FIG. 2 is intended to schematically show an embodiment of an exhaust system 27, with the invention being integrated into a motor vehicle 25 (for example a utility or commercial vehicle). A motor vehicle 25 of this type generally has a drive 26 (for example a diesel engine) in which exhaust gas is produced. The exhaust gas generally flows through various exhaust-gas treatment devices (catalytic converters, filters, reactors, absorbers, heaters, mixers . . . ), in the flow direction 32. It is illustrated in the figure that the exhaust gas firstly flows through an electrically heatable honeycomb body 2 constructed according to the invention, then through a catalytic converter 28 and finally through an accumulator 29 (for example for nitrogen oxides, particles or the like). The purified exhaust gas is then discharged to the atmosphere. It is also possible, for the operation of an electrically heatable honeycomb body of this type, to provide a control unit 30 (for example a vehicle controller or the like) which, for example, can supply current to the electrically heatable honeycomb body 2 at desired times on the basis of items of information from the drive 26 and/or sensors 31 provided in the exhaust system 27. It is clear that the exhaust system 27 illustrated herein is diagrammatic and may be combined and/or expanded in any desired combinations with other exhaust-gas treatment units.

Figure 3:
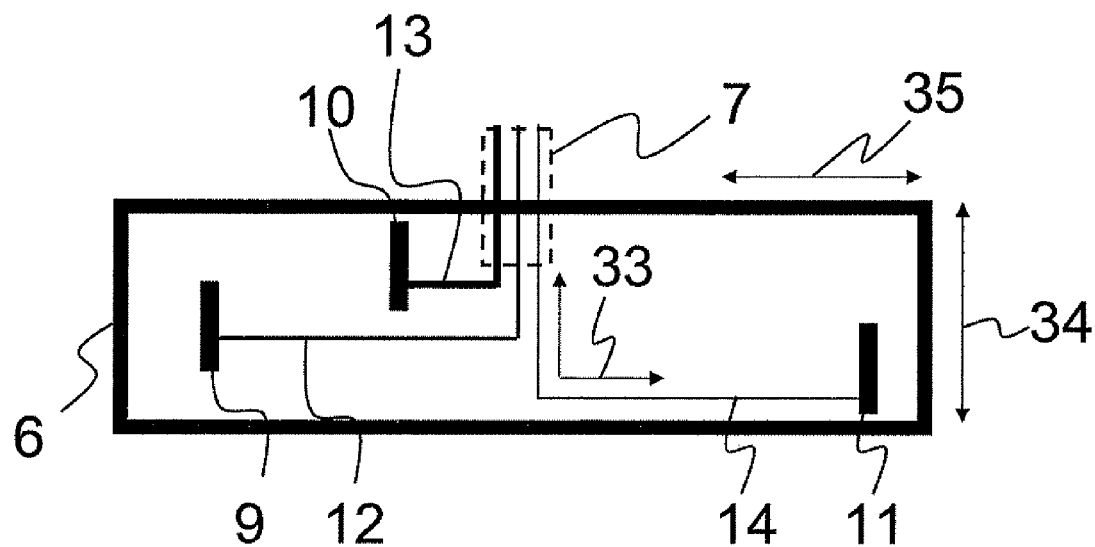
FIG. 3 is a developed view of a housing having a plurality of contact points.

FIG. 3 shows, for purposes of illustration, a developed view of a housing 6, that is to say a housing 6 which is illustrated substantially in a flat, unrolled state. A first contact conductor 12, a second contact conductor 13 and a third contact conductor 14 are combined at the terminal 7 which is disposed centrally in this case. The contact conductors 12, 13, 14 respectively extend separately to a first contact point 9, a second contact point 10 and a third contact point 11. In this case, the contact points are each disposed at a different spacing 33 from the single terminal 7. The different lengths of the contact conductors required for this purpose are adapted, for example, by providing different cross sections (illustrated herein through the use of lines of different thickness), in such a way that all of the contact conductors have the same electrical resistance. It can also be seen from FIG. 3 that the individual contact points may be disposed at different locations about the circumference 35 and/or along the length 34 (in the axial direction) of the housing 6.

Figure 4:
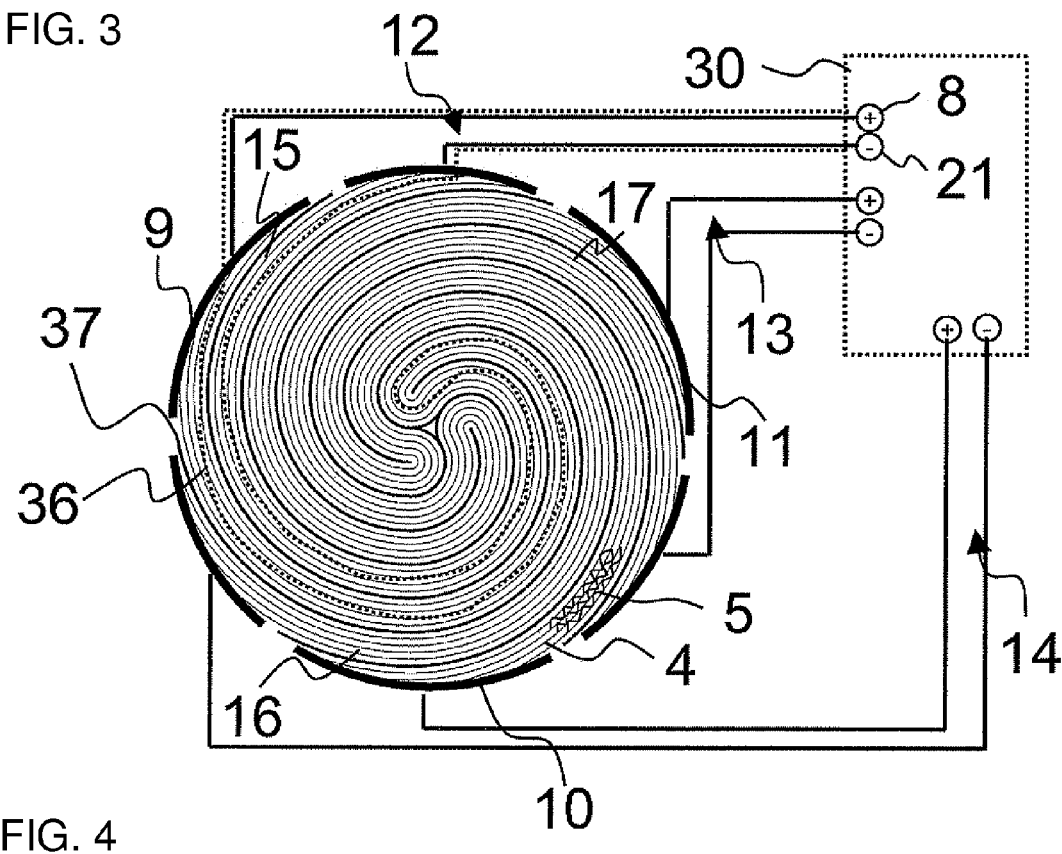
FIG. 4 is a cross-sectional view of a first embodiment of the device.

FIG. 4 is a plan view which shows a further structural variant of a device having an electrically heatable honeycomb body 2. The honeycomb body 2 is formed with a plurality of smooth sheet-metal foils 4 and structured sheet-metal foils 5 which, between them, delimit channels 3. In the end-side view shown therein, it can be seen that the honeycomb body 2 is formed with a first stack 15, a second stack 16 and a third stack 17. Each stack includes a multiplicity of smooth sheet-metal foils 4 and structured sheet-metal foils 5 having end regions which are disposed on the housing and inner regions with a bend which are disposed centrally. Insulation 37 is also provided between the individual stacks.

In the embodiment shown therein, the supply and discharge of current takes place substantially in a plane, in such a way that the housing, if appropriate, has a plurality of parts. A current path 36 (dotted line) is illustrated in this case by way of example for the first stack 15. Accordingly, the current flows from a voltage source 8 into a first contact conductor 12 and to the first contact point 9, and is introduced there into the sheet-metal foils. Therefore, the current, proceeding from one end region, now follows the sheet-metal foils to the central region and then returns to the opposite end region to the electrical ground 21. The two other stacks are traversed by current in a corresponding way. The introduction of current is realized through the use of a common control unit 30, with it being possible for the control unit 30 to operate the stacks (if appropriate individually and/or independently of one another).

Figure 5:
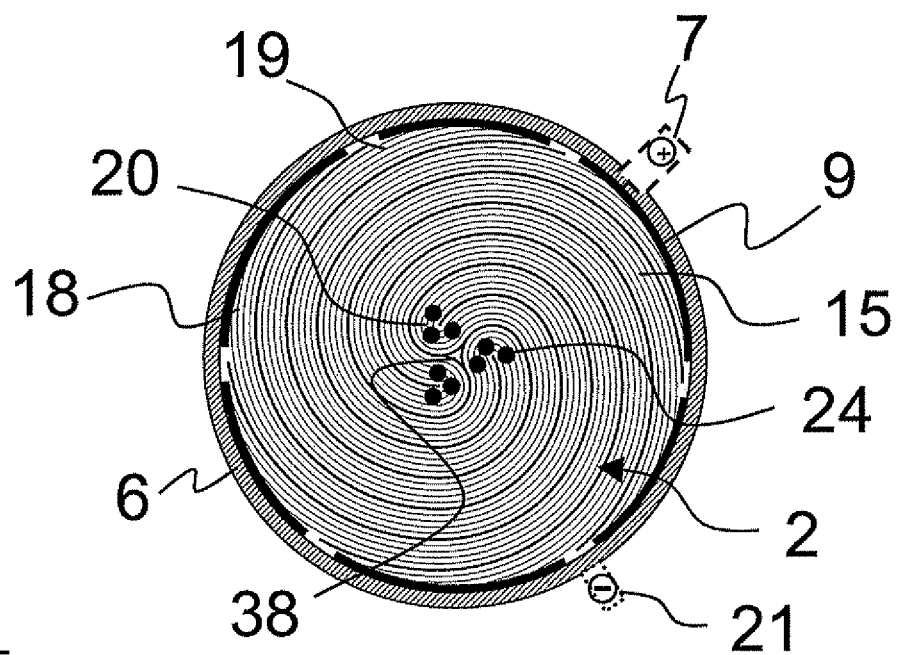
FIG. 5 is a cross-sectional view of a second embodiment of the device.

FIG. 5 illustrates a further end-side view of an electrically heatable honeycomb body 2 with a one-part tubular housing 6. In this case, current is supplied through the housing 6 in an at least partially electrically insulated fashion through the terminal 7. The current flows through electrical contact conductors, which may for example be sprayed on in the manner of a coating, to the respective contact points 9, 10, 11. The honeycomb body 2 is illustrated with three stacks, with only the first stack 15 being indicated with a reference numeral in this case by way of example. The first stack 15 in turn has sheet-metal foils which are disposed in this case in such a way as to extend with their first end region 18 and their second end region 19 to the housing 6 and which have an inner region 20 which is positioned in the vicinity of the center 38. In each case a multiplicity of contact pins 24 are now provided in the inner region 20. The contact pins 24 enable current to be conducted into a plane situated behind, for example to a support body 23, and thereby ultimately permit a connection to the electrical ground 21 which is schematically indicated therein.

Figure 6:
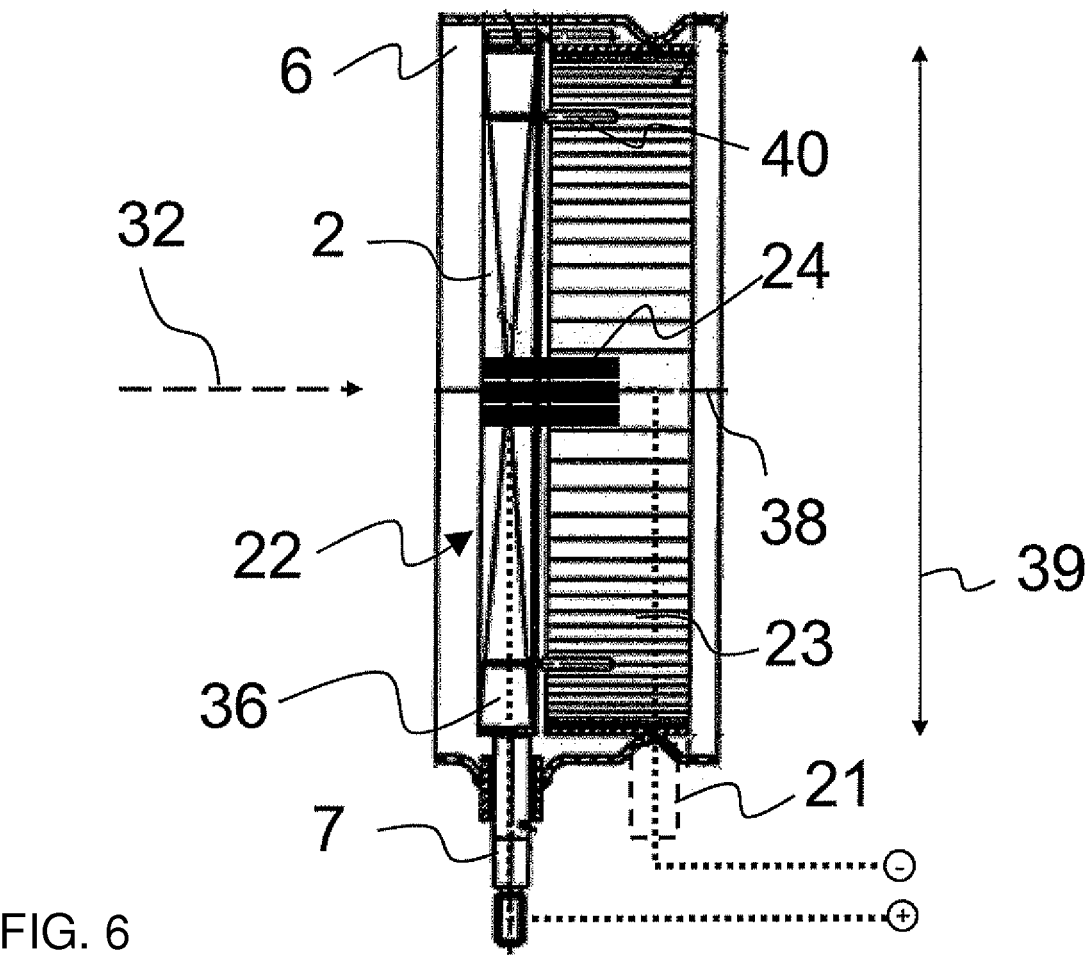
FIG. 6 is a longitudinal-sectional view of a further embodiment of the device having a support body positioned downstream.

Finally, reference is made to a physical exemplary embodiment of the device 1 illustrated in cross section in FIG. 6. The figure is intended in particular to illustrate the dimensional relationships such as are present in electrically heatable honeycomb bodies 2 with large diameters 39, for example. In this case, the diameter 39 is in particular at least 200 mm, although it may also be greater than 500 mm or even 1 m. The exhaust gas, which has been produced for example by a diesel engine of a truck, now flows in the flow direction 32 to the side 22 of the electrically heatable honeycomb body 2. There, the exhaust-gas flow is split up into a plurality of partial exhaust-gas flows, which then flow individually through the channels. In this case, the electrically heatable honeycomb body 2 is again positioned (in an electrically insulated fashion) in a housing 6. In this case, the electrically heatable honeycomb body 2 is disposed so as to be insulated with respect to the housing 6, with an electrically insulated supply of current simultaneously taking place to the honeycomb body 2 through the terminal 7. In this case, a current path 36 (dotted line) is now formed, in such a way that the honeycomb body 2 is traversed by current over a large area, and is heated due to its resistance. The electrically heatable honeycomb body 2 can now supply the heat to the through-flowing exhaust-gas flow for various purposes.

After the current has passed through the honeycomb body 2, the current is introduced through the contact pins 24, which are positioned in the center 38, into a support body 23 situated behind. The current is discharged through the support body 23 to the electrical ground 21. In this case, the electrically heatable honeycomb body 2 is fixed in a defined position, with a small gap to the support body 23 at the end side, not only through the use of the contact pins 24 but rather also through the use of (electrically insulated) support pins 40.

The invention claimed is:

1. A device, comprising:
   an electrically heatable honeycomb body having sheet-metal foils forming channels, said sheet-metal foils being disposed in a multiplicity of stacks which are electrically insulated from one another; and
   a housing electrically contacting said sheet-metal foils, said housing having a terminal for connection to a voltage source, a plurality of contact points, remote from said terminal, for contacting said sheet-metal foils, wherein a respective one of the plurality of contact points is provided for each one of said multiplicity of stacks, and all of said sheet-metal foils of said one of said multiplicity of stacks are contacted in an electrically conductive fashion at said respective one of the plurality of contact points; and
   contact conductors each connected between said terminal and a respective one of said contact points, said contact conductors having the same electrical resistance.

2. The device according to claim 1, wherein said sheet-metal foils have opposite end regions bearing against said housing.

3. The device according to claim 1, wherein said sheet-metal foils have an inner region electrically conductively connected to an electrical ground.

4. The device according to claim 1, wherein said sheet-metal foils have an inner region electrically conductively connected to an electrical ground, and said sheet-metal foils have the same electrical resistance from said contact point to said inner region thereof.

5. The device according to claim 1, wherein said contact conductors of said housing are formed as a coating.

6. The device according to claim 1, which further comprises a further support body, said electrically heatable honeycomb body having an end side supported on said further support body.

7. The device according to claim 6, which further comprises a multiplicity of electrically conductive contact pins supporting said electrically heatable honeycomb body through said end side and electrically conductively connecting said electrically heatable honeycomb body to said further support body.

8. The device according to claim 1, which further comprises a control unit, a plurality of said contact conductors being configured to be separately connected through said terminal and externally through said control unit to the voltage source.

9. A motor vehicle, comprising at least one device according to claim 1.

10. The device according to claim 1, wherein said contact conductors are insulated from each other.

11. A device, comprising:
    an electrically heatable honeycomb body having sheet-metal foils forming channels; and a housing electrically contacting said sheet-metal foils, said housing having a terminal for connection to a voltage source, a plurality of contact points, remote from said terminal, for contacting said sheet-metal foils, and contact conductors each connected between said terminal and a respective one of said contact points, said contact conductors having the same electrical resistance and being insulated from each other.

* * * * *